United States Patent
Londeree

(10) Patent No.: US 11,436,529 B1
(45) Date of Patent: Sep. 6, 2022

(54) METHOD, APPARATUS, AND COMPUTER PROGRAM PRODUCT FOR NATURAL LANGUAGE PROCESSING

(71) Applicant: Change Healthcare Holdings, LLC, Nashville, TN (US)

(72) Inventor: Alex Londeree, San Francisco, CA (US)

(73) Assignee: CHANGE HEALTHCARE HOLDINGS, LLC, Nashville, TN (US)

( * ) Notice: Subject to any disclaimer, the term of this patent is extended or adjusted under 35 U.S.C. 154(b) by 573 days.

(21) Appl. No.: 16/569,754

(22) Filed: Sep. 13, 2019

(51) Int. Cl.
| | | |
|---|---|---|
| *G06F 7/02* | (2006.01) | |
| *G06F 16/00* | (2019.01) | |
| *G06N 20/00* | (2019.01) | |
| *G06F 16/33* | (2019.01) | |
| *G06Q 30/02* | (2012.01) | |
| *G06F 16/35* | (2019.01) | |

(52) U.S. Cl.
CPC ......... *G06N 20/00* (2019.01); *G06F 16/3344* (2019.01); *G06F 16/3347* (2019.01); *G06F 16/353* (2019.01); *G06Q 30/0224* (2013.01)

(58) Field of Classification Search
CPC ... G06N 20/00; G06F 16/353; G06F 16/3347; G06F 16/3344; G06Q 30/0224
See application file for complete search history.

(56) References Cited

U.S. PATENT DOCUMENTS

| | | | |
|---|---|---|---|
| 9,058,327 | B1* | 6/2015 | Lehrman .............. G06F 16/93 |
| 2020/0257709 | A1* | 8/2020 | Bull .................... G06F 16/31 |
| 2020/0279189 | A1* | 9/2020 | Yamaguchi ....... G06F 16/90344 |

OTHER PUBLICATIONS

Bahdanau, D et al. "An Actor-Critic Algorithm for Sequence Prediction" Published as a conference paper at ICLR 2017, dated Mar. 3, 2017.
Huang, S. Introduction to Various Reinforcement Learning Algorithms. Part I (Q-Learning, SARSA, DQN, DDPG), [online] [retrieved Sep. 17, 2019], https://towardsdatascience.com/introduction-to-various-reinforcement-learning-algorithms-i-q-learning-sarsa-dqn-ddpg-72a5e0cb6587, dated Jan. 11, 2018.
Lillicrap, T et al. "Continuous Control with deep Reinforcement Learning" Published as a conference paper at ICLR 2016, dated 2016.

(Continued)

*Primary Examiner* — Bruce M Moser
(74) *Attorney, Agent, or Firm* — Myers Bigel, P.A.

(57) ABSTRACT

A method, apparatus and computer program product are provided for implementing an actor-critic model for processing a large document. The document is processed in smaller portions, and the information is accumulated or aggregated in a vector representation of the document. The vector representation may be reconfigured with each time step so that the vector representation includes an estimate of the most relevant information from the document processed thus far. The vector representation may be used to classify the document, such as by determining a primary and/or secondary diagnosis in a medical record. Feedback from the critic is provided in the form of a reward signal to the actor, which fine tunes its parameters and processes the different portions of the document. The actor-critic model may be trained with training data including documents and their known associated classifications.

19 Claims, 3 Drawing Sheets

(56) References Cited

OTHER PUBLICATIONS

He. J. et al., "Deep Reinforcement Learning with a Natural Language Action Space" [online] [retrieved Sep. 17, 2019], https://www.aclweb.org/anthology/P16-1153, dated Aug. 7-12, 2016.

* cited by examiner

METHOD, APPARATUS, AND COMPUTER PROGRAM PRODUCT FOR NATURAL LANGUAGE PROCESSING

TECHNOLOGICAL FIELD

Embodiments of the present invention relate generally to natural language processing and, more particularly, to methods, apparatuses, and computer program products for processing large documents to extract relevant information using an actor-critic deep learning model.

BACKGROUND

In the field of medical insurance claim processing, medical coders review medical records and statements to report pertinent codes and/or other information to payors (e.g., health insurance providers, government payors, such as Centers for Medicaid and Medicare Services (CMS), and/or the like). One example of a task frequently performed by a medical coder includes determining a primary diagnosis and any number of secondary diagnoses. A primary diagnosis may include the primary reason for the patient visit or treatment, or the chief cause for the patient's admission for medical treatment. Secondary diagnoses may include any other condition that coexists during the patient visit or encounter, and/or develops subsequently that may impact the patient. In some instances, the payor may determine the amount allowed to be billed and/or the amount payable by the payor depending on the primary diagnosis and secondary diagnoses. A medical coder may therefore require specific knowledge regarding medical terminology, anatomy, clinical procedures, illnesses, conditions, documentation practices, and/or the like, to interpret the various information on the medical record, and determine and/or verify the primary and/or secondary diagnoses. Even if a doctor or other practitioner has noted a primary and/or secondary diagnoses, the medical coder may verify and/or correct such information by reviewing the complete record, and making a determination in view of standards established and provided by the payor and/or a third party. Medical coders may therefore be trained in reviewing such documents, and identifying which portions of the documents are relevant in determining the diagnoses, which portions are irrelevant, and ultimately what the diagnoses should be.

Due to the volume of medical coding tasks, the extent of information in the medical records, and/or the potential for monetary loss (or missed gain) for the payor, provider and/or patient, a computer-implemented natural language solution for classifying the medical records for primary and secondary diagnoses is desired. Such implementations may be utilized to perform a classification of a medical record for primary and/or secondary diagnoses, verify classifications, such as those made by a doctor or other practitioner and/or other system, correct classifications, and/or flag certain medical records noted as needing further review and/or manual review by a medical coder.

Although many natural language processing techniques and deep learning algorithms have evolved, many of these methods cannot be practically implemented for such applications as deriving a primary diagnosis and/or secondary diagnoses from medical records, given the medical records' size, complexity, and/or unpredictable formatting and contents. For example, a human reviewing a large medical record or series of medical documents may be able to quickly identify that some portions are irrelevant to determining a primary and/or second diagnoses, and may quickly identify which sections are relevant. A human user may quickly move away from reviewing irrelevant portions, but may read the details of relevant portions in more detail to extract meaningful information, make inferences based on their knowledge of the field, and come to a determination of diagnoses. For example, irrelevant portions such as nursing notes, prescription orders, height and weight measurements, and/or the like may be easily identified and scanned over by a human viewer, but a machine parser may not be able to easily discern the relevance and may otherwise spend considerable processing time and resources processing the text and extracting information that is not even useful in reaching a diagnosis.

Many computer-implemented processes, such as those involving natural language processing and/or deep learning, utilize a memory buffer to parse the natural language text in an arrangement that enables meaningful extraction of semantic information. In some methods such as using a recurrent neural network (RNN) layer as a long short-term memory (LSTM) across the entire document, the memory buffer may be modified as a passage is processed. Many models have a memory buffer that is updated every time a step or iteration is performed. The memory buffer may be updated as the gated combination of its current state and the new state. The iterations required to build an accurate representation of the entirety of a large document and optimize the resulting model with back propagation, place significant memory and processing demands on the system, such that in practice, such techniques have been performed with success only on relatively small and/or simple documents, such as individual paragraphs, or short narratives presented in a uniform format. Alternative solutions that process only portions of the document at a given time may reduce the required memory and/or processing resources needed for implementation in a given episode or iteration, but may suffer from data loss and/or may omit pertinent semantic information when later attempting to aggregate or piece together all the information collected from numerous segments.

Some common tools for processing text in deep learning include convolutions, LSTM (and other similar recurrent techniques), and transformers. Convolutions have the drawback of only having the ability to encode information within a certain field of view, and they result in a sequence that then needs to be condensed to be aggregated. Recurrent models can dynamically aggregate over an entire sequence but tend to lose even important long term information after 50-100 steps. Some existing models also have the issue of each step relying on the result of the step before it, so they are less parallelizable, especially for long sequences. Transformer models involve comparing every word in a sequence to every other word in that sequence which winds up with a $n^2$ memory and compute time requirement (n is the length of the sequence), which is unfeasibly expensive in terms or memory and processing time when applied to larger documents. Hierarchical approaches involve splitting the document into chunks such as sentences, paragraphs, or pages and aggregating each step separately, then aggregating the sequence of chunks until you arrive on a single representation. To perform gradient decent optimization techniques using backpropagation, the entire document and its aggregations need to be held in memory which is unfeasible on modern hardware. Each aggregation is also created without an awareness of the information read in the sequence before it, so contextual information may not be processed properly.

To the extent any of these methods have been attempted on documents such as medical records and/or similar complex unstructured documents, such systems can often not provide the extensive memory and/or processing demands required for performing such processes on an entire unstructured and large document. The term "unstructured" is referenced to emphasize that the type of information expected in a document is not necessarily predefined or pre-known, nor is the information in a predefined format. Performing the aforementioned natural language processing methods on medical records and/or similar complex unstructured documents would require such extensive amounts of memory and/or processing resources that the costs of doing so (e.g., in memory usage, processing resources, and/or associated monetary cost thereof) outweigh any potential benefits. Computers and/or supercomputers configured to perform such operations may cost millions of dollars per year just to power and operate, in addition to a substantial initial manufacturing and/or purchase cost.

For example, some medical records may be as large as 400 pages with an average of 500 words per page. Performing natural language processing methods with LSTM, hierarchical deep learning, and/or the like on certain medical records or large unstructured documents may require such extensive memory and/or processing resources that such processes cannot be feasibly implemented to obtain accurate results. Accordingly, there is a need for a method to perform natural language processing and deep learning on a large unstructured document such as a medical record, with an improved level of accuracy and while requiring less memory and/or processing resources in comparison to known methods.

BRIEF SUMMARY

Methods, apparatuses, and computer program products are therefore provided for processing documents, such as large medical records, using an actor-critic model. Example embodiments perform deep learning by processing small portions of a large document at a time and aggregating the information in a vector representation of the document that is best suited for a given task—such as to identify a primary and/or secondary diagnosis of a patient with whom the large document (e.g., medical record) is associated.

Because the large documents are processed in segments, example embodiments must account for the information processed and obtained from prior iterations. In particular, in order to efficiently perform natural language processing on the large unstructured document, example embodiments process the document in subsections or portions, and example embodiments determine the relevancy of the information obtained in the particular iteration, relative to all the prior information obtained from processing different portions of the document. Example embodiments may then determine how the information should progressively be aggregated or accumulated in order to provide the best estimate, in a data structure, that wholly represents the pertinent information obtained from the document (e.g., medical record) over all the iterations performed.

As one of ordinary skill in the art will recognize, actor-critic models to deep learning neural networks were developed to train computer models in solving problems in specific environments, such as predefined, structured environments. The actor-critic model is a deep reinforcement learning process, which utilizes an actor neural network, or simply, an "actor," and a critic neural network, or "critic," where the actor iteratively tunes a neural network to gradually reach an optimal policy.

According to example embodiments, the policy of the actor-critic model developed is a mapping from observation state to action in an environment, where actions are chosen by the actor as it scans a document, and the environment may be considered a combination of the document and the vector representation of the document. In one embodiment, the actor and critic can act on the environment by updating the vector representation of the document and by deciding which part of the document to read next. Any updates to the vector representation, and the portion of the document to be read next, may be considered the action space.

According to embodiments, the actor is tuned by using feedback from a critic network. The critic takes an action state and an observation state and estimates a discounted expected future reward. The actor's policy is tuned to maximize the critic's expected future reward value. The critic it tuned to estimate the discounted reward expressed at the next state as a result of the action taken. Each iteration performed by the actor and/or critic may be referred to as a time step. Each time step may provide an observation of the current state of the vector representation and the chosen location in the document to read. Embodiments of the present invention populate a vector representation of the document (e.g., medical record) to yield a machine readable data structure from which to classify the document (e.g., determine a primary and/or secondary diagnosis). At any given time through the numerous actor-critic iterations, the vector representation provides a summary of all the important or relevant information derived from the document at that point in time. As the iterations repeat, example embodiments aim to improve the relevancy of the vector representation and the accuracy with which the vector wholly represents the pertinent information in the document. In this regard, the actor generates a new vector representation of the document so far given the portion of the document, and the critic provides an estimate of the task-based reward given the aggregation-so-far, the portion of the document and the new aggregation-so-far. The actor reads the current state of the vector representation and the next section of the document and updates the vector representation and decides which section of the document to read next.

In this regard, example embodiments initialize a vector representation of the document, which may only cover a portion of the document. In subsequent iterations, different portions of the document are processed, and the vector representation is reconfigured by inputting the current version of the vector and applying newly acquired information. Accordingly, semantic information taken from the document in repeated iterations is aggregated and/or accumulated in the vector representation through deep learning and optimization. The vector representation can then be used to classify the document, such as to determine a primary and/or secondary diagnosis.

It will be appreciated that the term optimization or optimizing may be referred to as aggregating a reasonable estimate of a vector representation of a document according to deep learning and optimization algorithms performed by example embodiments, and is not necessarily meant to limit the scope to determining the absolute most optimal value. It will be further appreciated that the term optimization also has a specific definition in the domain of machine learning, including the updating of parameters in the mathematical operation to minimize the cost function. It will be further appreciated that although the classification of medical records for primary and/or secondary diagnoses may be referenced throughout, example embodiments provided herein may be utilized to derive semantic information from any type of document comprising natural language text. Likewise, example embodiments provided herein may be utilized to classify large documents in other fields and domains.

According to example embodiments of the present disclosure, an apparatus is provided for utilizing trained vector modeling circuitry and trained evaluation circuitry to classify a document by iteratively aggregating data from the document into a vector representation. The apparatus comprises at least one processor and at least one memory including computer program code, the at least one memory and the computer program code configured to, with the processor, cause the apparatus to at least receive an indication of the document comprising at least natural language text, and with the trained vector modeling circuitry, read a current state of the vector representation and a subsequent portion of the document to be processed, and update the vector representation based on the current state of the vector representation and the subsequent portion of the document to produce an updated state of the vector representation. The apparatus may further be configured to, with the trained evaluation circuitry, calculate a reward signal based on the current state of the vector representation and the updated state of the vector representation; and to iteratively repeat the reading of the current state of the vector representation and the subsequent portion of the document, and the updating of the vector representation based on the reward signal, wherein the updated state of the vector representation is used to perform a semantic classification process to determine a classification of the document.

A method is also provided for utilizing trained vector modeling circuitry and trained evaluation circuitry to classify a document by iteratively aggregating data from the document into a vector representation. The method comprises receiving an indication of the document comprising at least natural language text, and with the trained vector modeling circuitry implemented by at least a processor, initializing the vector representation in memory by incorporating information from an identified portion of the document into the vector representation. The method may include, with the trained evaluation circuitry, evaluating a relevancy of the vector representation of the document by evaluating a quality of a semantic classification process performed on the vector representation to determine a classification of the document. In some embodiments, evaluating the relevancy may comprise measuring the quality of the resulting aggregation (or vector representation) not on its classification loss but on the real-world value of the classifications made as a result of the aggregation.

According to certain embodiments, the method further includes iteratively repeating with the trained vector modeling circuitry, reconfiguring in memory the vector representation based on a subsequent portion of the document; and with the trained evaluation circuitry, evaluating the relevancy of the reconfigured vector representation by evaluating the quality of the semantic classification process performed on the reconfigured vector representation.

A computer program product is also provided for utilizing trained vector modeling circuitry and trained evaluation circuitry to classify a document by iteratively aggregating data from the document into a vector representation, the computer program product comprising at least one non-transitory computer-readable storage medium having computer-executable program code instructions stored therein, the computer-executable program code instructions comprising program code instructions to, receive an indication of the document comprising at least natural language text, and with the trained vector modeling circuitry implemented by at least a processor, initialize the vector representation in memory by incorporating information from an identified portion of the document into the vector representation, and with the trained evaluation circuitry, evaluate a relevancy of the vector representation of the document by evaluating a quality of a semantic classification process performed on the vector representation.

The computer-executable program code instructions may comprise program code instructions to iteratively repeat: with the trained vector modeling circuitry, reconfigure in memory the vector representation based on a subsequent portion of the document; and with the trained evaluation circuitry, evaluate the relevancy of the reconfigured vector representation by evaluating the quality of the semantic classification process performed on the reconfigured vector representation.

The trained vector modeling circuitry and the trained evaluation circuitry may be trained by receiving an indication of a plurality of training documents and corresponding confirmed classifications, and training the vector modeling circuitry and the evaluation circuitry by performing iterations of vector modeling on the plurality of training documents and evaluation of the determined classifications compared to the confirmed classifications.

According to certain embodiments, at least a portion of the computer program code, the method, apparatus, processor, and/or memory utilizes an actor-critic algorithm, wherein the trained vector modeling circuitry represents an actor, and the trained critic circuitry represents a critic.

The trained vector modeling circuitry is configured to initialize parameters utilized in generating an action to perform on at least the portion of the document, generate the action based on the initialized parameters, and adjust the parameters to generate a subsequent action according to the evaluation provided by the trained evaluation circuitry.

Evaluating the quality of the semantic classification process may comprise determining a reward signal, wherein the reward signal is determined based on a predicted accuracy in classifying the document according to the vector representation. The reward signal may be further based on a value function comprising an estimated monetary reward associated with the classification made as a result of the aggregation, and may be computed after an episode is completed. The reward may represent the task related value of the vector representation. Evaluating the quality of the semantic classification process may include calculating an error signal associated with the vector representation, and applying the error signal to a gradient descent algorithm, wherein the evaluation circuitry determines a last iteration and a final vector representation according to when the gradient descent algorithm converges.

The semantic classification process comprises at least one of determining there is not enough information in the vector representation for classifying the document, or classifying the document according to the vector representation, wherein if it is determined there is not enough information in the vector representation for classifying the document, the method, apparatus, computer program code, processor, and/or memory may be configured to identify subsequent portions of the document to be processed.

The document may be a medical record, and classifying the document comprises determining at least one of (a) a primary diagnosis or (b) one or more secondary diagnoses.

An apparatus is provided with means for utilizing trained vector modeling circuitry and trained evaluation circuitry to classify a document by iteratively aggregating data from the document into a vector representation. The apparatus includes means for receiving an indication of the document comprising at least natural language text, and means for, with the trained vector modeling circuitry, initializing the vector representation in memory by incorporating information from an identified portion of the document into the vector representation. The apparatus may include means for, with the trained evaluation circuitry, evaluating a relevancy of the vector representation of the document by evaluating a quality of a semantic classification process performed on the vector representation to determine a classification of the document.

According to certain embodiments, the apparatus may further include iteratively repeating with the trained vector modeling circuitry, reconfiguring in memory the vector representation based on a subsequent portion of the document, and means for, with the trained evaluation circuitry, evaluating the relevancy of the reconfigured vector representation by evaluating the quality of the semantic classification process performed on the reconfigured vector representation.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the disclosure in any way. It will be appreciated that the scope of the disclosure encompasses many potential embodiments, some of which will be further described below, in addition to those here summarized.

BRIEF DESCRIPTION OF THE SEVERAL VIEWS OF THE DRAWINGS

Figure 1:
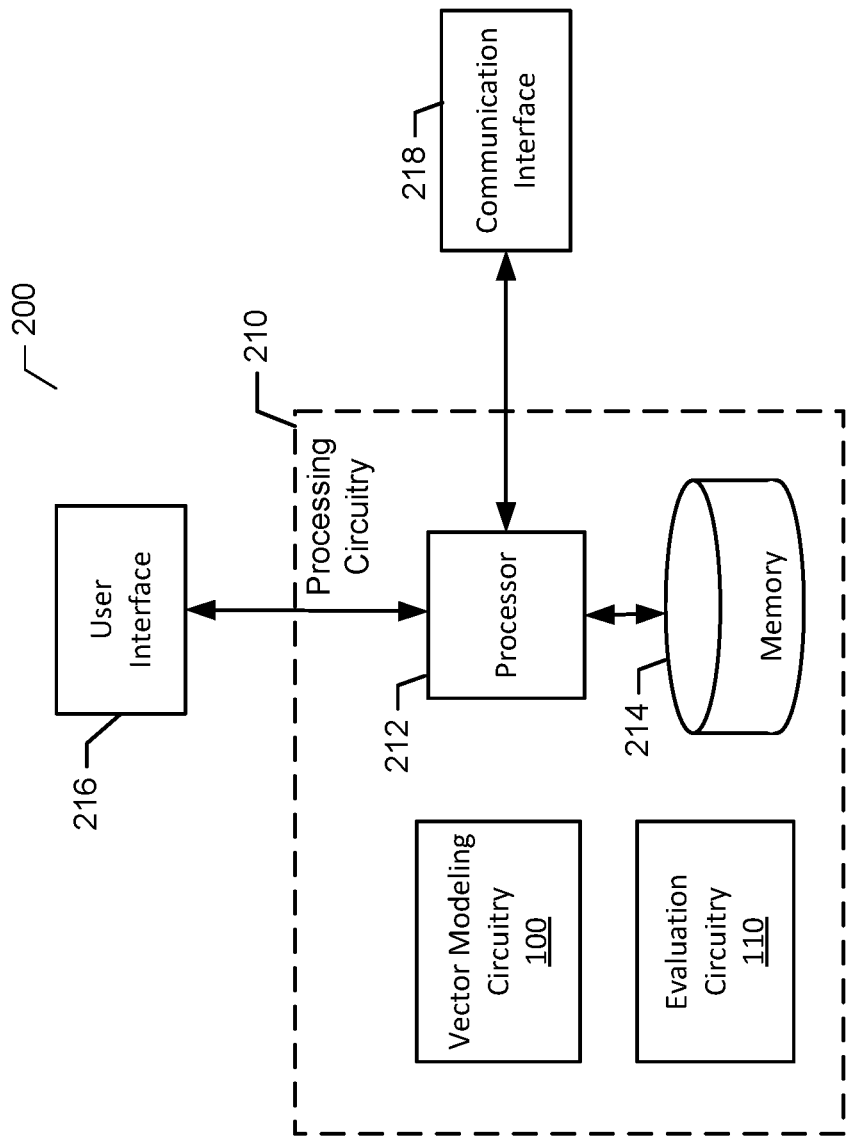
Figure 2:
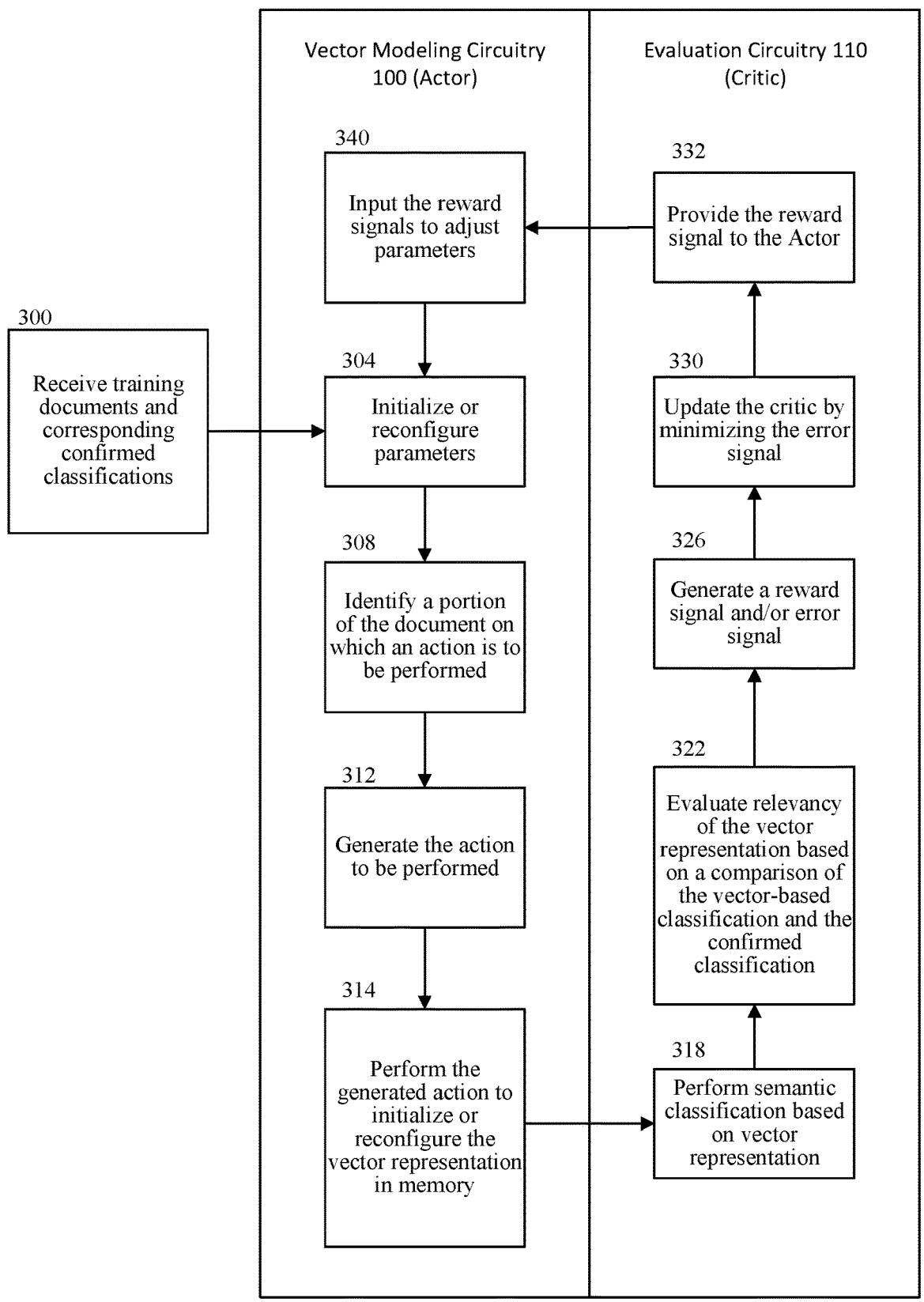
Figure 3:
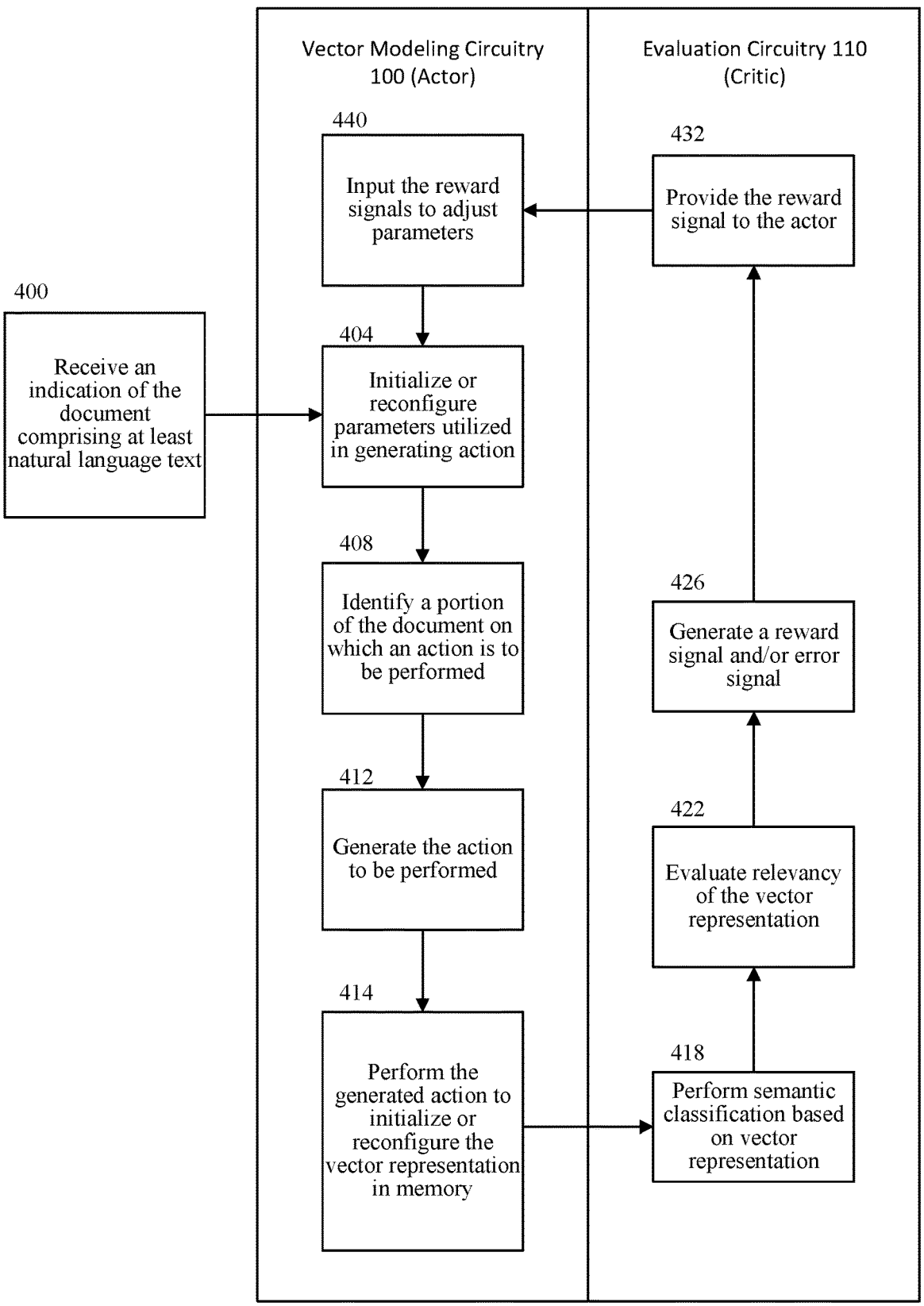

Having thus described embodiments of the invention in general terms, reference will now be made to the accompanying drawings, which are not necessarily drawn to scale, and wherein:

FIG. 1 is an example overview of a system that can be used to practice some example embodiments described herein; and FIGS. 2 and 3 are flowcharts of operations that may be performed in accordance with some example embodiments.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

As used herein, where a computing device is described herein to receive data from another computing device, it will be appreciated that the data may be received directly from the other computing device and/or may be received indirectly via one or more intermediary computing devices, such as, for example, one or more servers, relays, routers, network access points, and/or the like. Similarly, where a computing device is described herein to transmit data to other computing device, it will be appreciated that the data may be sent directly to the other computing device or may be sent to the other computing device via one or more interlinking computing devices, such as, for example, one or more servers, relays, routers, network access points, and/or the like.

FIG. 1 is an overview of an apparatus 200 that can be used to generate a vector representation of a document and/or classify the document according to certain example embodiments described herein. For example, apparatus 200 may be utilized in training a neural network(s) and/or implementing the neural network(s) in a non-training environment. In this regard, apparatus 200 may be implemented as a computing device(s) and/or distributed system configured for implementing example embodiments described herein.

It should be noted that the components, devices, and elements illustrated in and described with respect to FIG. 1 may not be mandatory and thus some may be omitted in certain embodiments. For example, FIG. 1 illustrates a user interface 216, as described in more detail below, which may be optional in some embodiments. Additionally, some embodiments may include further or different components, devices, or elements beyond those illustrated in and described with respect to FIG. 1.

Processing circuitry 210 may be configured to perform actions in accordance with one or more example embodiments disclosed herein. For example, processing circuitry 210 may comprise vector modeling circuitry 100 and/or evaluation circuitry 110. Vector modeling circuitry 100 and evaluation circuitry 110 are distinguished for illustrative purposes and for the explanation of various operations described herein, but it should be appreciated that in some embodiments, vector modeling circuitry 100 and/or evaluation circuitry 110 may include, and/or may be embodied by processor 212 and memory 214, described below. The processing circuitry 210 may include additional circuitry for carrying out various operations described herein.

In this regard, the processing circuitry 210 (e.g., vector modeling circuitry 100, evaluation circuitry 110, and/or the like), may be configured to perform and/or control performance of one or more functionalities of apparatus 200 in accordance with various example embodiments. The processing circuitry 210 (e.g., vector modeling circuitry 100, evaluation circuitry 110, and/or the like) may be configured to perform data processing, application execution, and/or other processing according to one or more example embodiments. For example, with respect to the actor-critic algorithms, the vector modeling circuitry 100 may implement the actor component of the algorithm, and the evaluation circuitry 110 may implement the critic component of the algorithm. In this regard, the vector modeling circuitry 100 is trained to aggregate information extracted from the document into a vector, and the evaluation circuitry 110 may be configured to provide feedback on each action performed by the vector modeling circuitry 100. Specifically, the vector modeling circuitry 100, or actor, reads the current state of the vector representation, and the next section of the document, updates the vector representation and decides which section of the document to read next. The evaluation circuitry 110, or critic, produces an estimate of the discounted expected future reward given the current state of the vector representation, a currently read portion of the document, the actor's updated representation of the document in the memory buffer, and which section of the document the actor has chosen to read next. Together, the actor and critic form an agent configured to construct a vector representation representing the document.

In some embodiments apparatus 200, or a portion(s) or component(s) thereof, such as the processing circuitry 210, may be embodied as or comprise a circuit chip. The circuit chip may constitute means for performing one or more operations for providing the functionalities described herein.

In some example embodiments, the processing circuitry 210 (e.g., vector modeling circuitry 100, evaluation circuitry 110, and/or the like) may include a processor 212, and in some embodiments, such as that illustrated in FIG. 1, may further include memory 214. The processing circuitry 210 (e.g., vector modeling circuitry 100, evaluation circuitry 110, and/or the like) may be in communication with or otherwise control a user interface 216, and/or a communication interface 218. As such, the processing circuitry 210 (e.g., vector modeling circuitry 100, evaluation circuitry 110, and/or the like) may be embodied as a circuit chip (e.g., an integrated circuit chip) configured (e.g., with hardware, software, or a combination of hardware and software) to perform operations described herein.

The processor 212 may be embodied in a number of different ways. For example, the processor 212 may be embodied as various processing means such as one or more of a microprocessor or other processing element, a coprocessor, a controller, or various other computing or processing devices including integrated circuits such as, for example, an ASIC (application specific integrated circuit), an FPGA (field programmable gate array), or the like. Although illustrated as a single processor, it will be appreciated that the processor 212 may comprise a plurality of processors. The plurality of processors may be in operative communication with each other and may be collectively configured to perform one or more functionalities of apparatus 200 as described herein. The plurality of processors may be embodied on a single computing device or distributed across a plurality of computing devices collectively configured to function as vector modeling circuitry 100, evaluation circuitry 110, and/or apparatus 200. In some example embodiments, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA, or the like, the processor 212 may be specifically configured hardware for conducting the operations described herein. Alternatively, as another example, when the processor 212 is embodied as an executor of software instructions, the instructions may specifically configure the processor 212 to perform one or more operations described herein.

In some example embodiments, the memory 214 may include one or more non-transitory memory devices such as, for example, volatile and/or non-volatile memory that may be either fixed or removable. In this regard, the memory 214 may comprise a non-transitory computer-readable storage medium. It will be appreciated that while the memory 214 is illustrated as a single memory, the memory 214 may comprise a plurality of memories. The plurality of memories may be embodied on a single computing device or may be distributed across a plurality of computing devices. The memory 214 may be configured to store information, data, applications, computer program code, instructions and/or the like for enabling apparatus 200 to carry out various functions in accordance with one or more example embodiments. For example, memory 214 may be configured to store computer program code for performing functions of vector modeling circuitry 100 and/or evaluation circuitry 110, as described herein according to example embodiments. In this regard, various algorithms perform by the actor and/or critic (e.g., vector modeling circuitry 100 and/or evaluation circuitry 110) may be stored on memory 214 as computer program code. In this regard, memory 214 may be further configured to enable execution of various neural network-based algorithms, such as but not limited to convolutional algorithm, a long term short term memory (LSTM) algorithm, or a transformer algorithm.

Still further, memory 214 may be configured to store electronic documents, such as medical records and/or associated textual representations thereof, such as those generated by performing Optical Character Recognition (OCR) on the medical records. As the electronic documents are processed as described herein, the memory 214 may initialize and/or modify a vector representation, configured as a multi-dimensional vector and/or the like, for storing a vector representation of an electronic document. Accordingly, the memory 214 may be modified as described herein, to reconfigure a vector representation of an electronic document according to example embodiments.

The memory 214 may be further configured to buffer input data for processing by the processor 212. Additionally or alternatively, the memory 214 may be configured to store instructions for execution by the processor 212. In some embodiments, the memory 214 may include one or more databases that may store a variety of files, contents, or data sets. For example, memory 214 may be configured to store actions generated by the vector modeling circuitry 100, which may encompass any of the algorithms or portions thereof stored on memory 214.

Among the contents of the memory 214, applications may be stored for execution by the processor 212 to carry out the functionality associated with each respective application. In some cases, the memory 214 may be in communication with one or more of the processor 212, user interface 216, and/or communication interface 218, for passing information among components of apparatus 200.

The optional user interface 216 may be in communication with the processing circuitry 210 to receive an indication of a user input at the user interface 216 and/or to provide an audible, visual, mechanical, or other output to the user. As such, the user interface 216 may include, for example, a keyboard, a mouse, a display, a touch screen display, a microphone, a speaker, and/or other input/output mechanisms. In some example embodiments, aspects of user interface 216 may be limited or the user interface 216 may not be present.

The communication interface 218 may include one or more interface mechanisms for enabling communication with other devices and/or networks. In some cases, the communication interface 218 may be any means such as a device or circuitry embodied in either hardware, or a combination of hardware and software that is configured to receive and/or transmit data from/to a network and/or any other device or module in communication with the processing circuitry 210 (e.g., vector modeling circuitry 100 and/or evaluation circuitry 110). By way of example, the communication interface 218 may be configured to enable communication amongst apparatus(es) 200 and/or any other devices over a network. For example, when apparatus 200 is implemented as a distributed system, communication interface 218 may be configured to enable communication throughout the system. In this regard, the communication interface 218 may facilitate the communication of medical records amongst various component of the system. Accordingly, the communication interface 218 may, for example, include supporting hardware and/or software for enabling wireless and/or wireline communications via cable, digital subscriber line (DSL), universal serial bus (USB), Ethernet, or other methods.

The network, such as the network in which the apparatus 200 may operate, may include a local area network, the Internet, any other form of a network, or in any combination thereof, including proprietary private and semi-private networks and public networks. The network may comprise a wired network and/or a wireless network (e.g., a cellular network, wireless local area network, wireless wide area network, some combination thereof, and/or the like).

Having now described an example apparatus for implementing example embodiments, FIG. 2 is a flowchart illustrating example operations of an apparatus 200, according to some example embodiments. The operations of FIG. 2 may be performed by apparatus 200, such as with the vector modeling circuitry 100, evaluation circuitry 110, processor 212 and/or the like to train the vector modeling circuitry 100 and evaluation circuitry 110.

As shown by operation 300, apparatus 200 may include means, such as processor 212, memory 214, communication interface 218 and/or the like, for receiving training documents and confirmed classifications. In this regard, the training documents may comprise medical records and/or the like. Medical coders and/or the like review the documents to determine a classification, such as a primary and/or second diagnoses, by applying their knowledge, experience, and expertise. The documents may be classified (e.g., coded) as they are in a manual review process. The determined or confirmed classifications may then be documented and/or stored in memory 214 in association with the medical records from which the diagnoses was derived to serve as training data. The documents may be input to the training algorithm as unstructured documents and/or natural language text. Other processes may perform optical character recognition (OCR) and/or the like to generate the text in a machine readable electronic format. It will be appreciated that any references to document made throughout the present disclosure may refer to the unstructured electronic document and/or the text generated therefrom, such as may be generated with an OCR process.

In operation 304, apparatus 200, may include means, such as vector modeling circuitry 100, processor 212, memory 214 and/or the like, for initializing or reconfiguring parameters or weights to apply to a policy for processing the document and extracting meaningful information. According to some embodiments, in a first iteration of the training, the parameters may be randomly initialized. In subsequent iterations, the parameters may be reconfigured or adjusted based on feedback from the critic (discussed in further detail below).

In this regard, a policy function $$\pi_{\theta_{(s,a)}} = P[\alpha|s,\theta]$$

may be tuned by the parameters θ, and may direct the vector modeling circuitry 100 to generate an action according to the policy. According to example embodiments, the parameters may include matrices that will be applied via matrix multiplication to a matrix representation of the selected portion of a document (described in further detail below) in a given iteration.

In operation 308, the apparatus 200, may include means, such as vector modeling circuitry 100, processor 212, memory 214 and/or the like, for identifying a portion of the document on which the action is to performed. As introduced above, example embodiments may perform algorithms for processing natural language text on only relatively small portions of text. Performing such algorithms on too large of a text, such as entire medical record, may require so much memory that the process becomes inefficient and unfeasible to perform on a medical record. The vector modeling circuitry 100 may therefore initially identify a portion of the document at random. According to some embodiments, the vector modeling circuitry may initially process a first page or section of the document, repeat the page or section just processed, and/or select the next section and/or page for processing. Further iterations may adjust the portion of the document processed based on feedback from the critic (discussed in further detail below). In some iterations, it may be determined that the same portion of the document should be reprocessed, but using other adjusted parameters (e.g., a different matrix by which to multiply the matrix representation of the document portion), therefore producing a different action performed on the same portion of the document. In some iterations, a portion of a document may be determined to not be useful in determining a diagnosis, and therefore may not be re-processed in subsequent actions.

The portion of the document selected for a given iteration may be selected in a variety of ways. For example, as described in further detail below, the critic (e.g., evaluation circuitry 110) may provide a reward signal indicating the value of an action taken by the actor. According to some example embodiments, if a threshold reward signal is achieved or exceeded, the actor (e.g., vector modeling circuitry 100) may determine to reprocess the same portion of the document. If the threshold reward signal is not achieved or exceeded, the actor (e.g., vector modeling circuitry 100) may determine to move on to processing a different portion of the document. In some examples, the size of the portion of document processed in a given iteration may be a predefined size in bytes, words, pixels, and/or page percentage. In some examples, the portion of the document may be defined by a formatting or stylistic division, such as by paragraph breaks, page breaks, or tables.

In operation 312, apparatus 200, may include means, such as vector modeling circuitry 100, processor 212, memory 214 and/or the like, for generating the action to be performed on the document. The example policy function provided above may be used to generate the action, and may take into account the portion of the document which is to be processed, and how the portion of the document is to be processed and incorporated into the vector representation. The action may include an update to the vector representation and a choice as to which part of the document to read next. The action may additionally or alternatively include extracting information from the document to determine what the new or reconfigured vector representation should be, given the current state vector representation and the newly identified portion of the document. The goal of the actor in generating an action is to generate an action (or series of actions, through the iterations described herein) that yields the most accurate representation of pertinent information in the document.

In this regard, in example embodiments, the action space may initialize or modify the vector representation and determine what information should be processed next, (e.g., read the next portion of the document, or reread the portion just processed). When the vector representation is being initialized for the first time, the actor (e.g., vector modeling circuitry 100) populates a series of matrices according to the initialized parameters and inputs the identified portion of the document to perform a dot product matrix multiplication operation over the input. In a first episode, the matrices are generated randomly/semi-randomly, initialized to zero, or initialized based on something to do with the task or document metadata, and evaluated as described in further detail below.

When a current vector representation is being reconfigured to generate a new or updated vector representation, the action may for example, through a series of matrix multiplication, map a current vector representation onto a new vector representation (e.g., reconfigured vector representation) of the document.

In operation 314, apparatus 200, may include means, such as vector modeling circuitry 100, processor 212, memory 214 and/or the like, for performing the generated action on the identified portion of the document to initialize or reconfigure the vector representation in memory. Prior to an initial episode of the training process being performed on a particular document, the vector representation of the document may not yet be initialized. Performing the generated action may therefore result in initializing a vector representation of the document.

The vector representation may be a list of vectors or multi-dimension vector, and may be considered a structured collection of data representing all the pertinent information processed by the vector modeling circuitry 100. In this regard, the vector representation may include information obtained from prior episodes of processing the documents, and the information is aggregated into the vector gradually with each iteration or episode of the training. The vector representation is continually updated, and mapped back to the document such that each element of the vector is mapped to a specific originating position in the document.

A first time step of the training process performed on a particular document may therefore yield a representation of only the first identified portion of a document to be processed. In subsequent time steps of the training, the information determined as pertinent to the desired task (e.g., determining a primary and/or secondary diagnoses), is aggregated into the vector representation so that the vector representation accumulates data gleaned from the processing through the training. Said differently, a current state vector representation may be considered as input to the vector modeling circuitry 100 in each time step or iteration, and the reconfigured vector representation reflects all pertinent information obtained from the document at that point in time, including the information determined from the current time step. In this regard, information discovered as less pertinent to the classification and/or diagnoses (described in further detail below with regard to the critic), may be gradually removed from, or weighted less than, more relevant information that proves to be more useful in successfully determining a classification and/or diagnosis.

As such, the actor, (e.g., vector modeling circuitry 100), aims to reconfigure a vector representation in each time step to aggregate relevant information from the document. According to some embodiments, the vector modeling circuitry 100 may perform several time steps to complete an episode and obtain feedback from the evaluation circuitry 110 with which to begin another episode. As the time steps and episodes continue, the goal of the actor is to improve the relevancy of the vector representation. This does not necessarily mean summarizing all portions of the document equally, but rather discerning through deep learning and feedback from the critic, which portions of the document are important, and which portions are not important or are less important in determining a primary and/or secondary diagnosis. Because example embodiments can process only portions of a document in a given time step, example embodiments may aggregate the information into the vector representation so that the most useful aspects of a very large document (e.g., medical record) may be represented, without having to maintain the entire processing of the document in memory. In this regard, information determined to be less important than information determined to be important or pertinent in accomplishing a task (e.g., classification or medical diagnosis) may be deleted from the vector representation as it is reconfigured throughout the iterations, or the less important information may be omitted from the vector representation as it is considered to be re-created in subsequent interactions (with the prior version of the vector serving as an input to the action, and therefore, being incorporated into the new vector representation).

The actor (e.g., vector modeling circuitry 100) may therefore be considered a model trained on an input of the portion of the document being processed and/or parsed and a current state vector representation. The actor (e.g., vector modeling circuitry 100) is trained to output a new summary (or an update to the summary) and an additional action determining which section of the document to read next. The actor's goal is to maximize the reward provided by the critic, as described in further detail below.

As shown in operation 318, after the actor (e.g., vector modeling circuitry 100) completes a cycle of initializing or reconfiguring the vector representation, apparatus 200, may include means, such as evaluation circuitry 110, processor 212, memory 214, communication interface 218 and/or the like, for performing semantic classification based on the vector representation. In this regard, the critic (e.g., evaluation circuitry 110) may communicate the vector representation to a separate process and/or module for performing classification of the document.

The semantic classification process may therefore be an existing and/or separate process that inputs the vector representation, and determines a classification of a document, such as but not limited to a primary diagnosis and/or second diagnosis. In some embodiments, the semantic classification process, or classifier, may determine that the vector representation does not contain enough information to make a classification. The semantic classification process may comprise any number of rules and/or algorithms that indicate likely outcomes and/or conclusions that may be drawn from the data contained in the vector representation. In this training phase of example embodiments, the classifier (or series of classifiers) aims to classify the document based on its vector representation.

In operation 322, apparatus 200, may include means, such as evaluation circuitry 110, processor 212, memory 214 and/or the like, for evaluating a relevancy of the vector representation based on a comparison of the vector-based classification and the confirmed classification. The evaluation circuitry 110, such as with processor 212, may evaluate the relevancy of the vector representation by determining the impact the last action performed by the actor had on the vector representation in leading to an accurate classification (e.g., diagnosis). In some embodiments, the relevancy may be a value calculated by the critic, and the critic is trained to provide the feedback. As time steps and episodes continue, the critic provides feedback on which portions of the document yield relevant information, and the actor fine tunes its processing to focus more on the relevant portions of text, and less on irrelevant or less relevant portions of text.

According to some embodiments, and as shown in operation 326, apparatus 200, may include means, such as evaluation circuitry 110, processor 212, memory 214 and/or the like, for generating a reward and/or error signal. The reward and/or error signal may include any quantitative evaluation for determining the relevancy and/or how well the vector representation represents the pertinent information from the document. According to some embodiments, the reward signal may be the discounted future reward signal calculated based on the last action taken. For example, the discounted future reward signal may be generated from a state of the vector representation (e.g., prior to the update) and the updated state of the vector representation.

According to some embodiments, the quality of the semantic classification may reflect that there is not enough information in the vector representation to make a classification, resulting in a relatively low or weak reward signal in comparison to other actions that result in the classifier making an accurate classification, and therefore, having a relatively high or strong reward signal. The quality of the semantic classification may reflect varying reward signal (e.g., the discounted expected future reward), indicating the relevancy of the vector representation in enabling the classifier to accurately classify the document.

An error signal may be calculated as $$r_{t+1} + \gamma V^\pi(s_{t+1}) - V^\pi(s_t)$$

and may reflect the error in the classifier's ability to classify the document, relative to the confirmed or known classification of the respective document. Example embodiments aim to minimize the error signal over time by minimizing the error between the expected future reward and the reward at the next time step plus the discounted expected future reward at the next time step.

As set forth above, the estimated discounted future reward signal may be generated by the critic and provided to the actor as feedback. In the example of classifying medical records, the reward may represent a monetary calculation of savings and/or reward for correctly classifying the document, calculated as actual dollar savings otherwise expended on man hours such as by medical coding, for manual review and processing. The monetary reward may also be calculated based on time and resources needed for resubmitting and/or reprocessing documents that were incorrectly classified, or in cases in which the primary and/or secondary diagnosis was misinterpreted. According to some examples, the reward signal may be weighted. If an action leads to a diagnosis not validly represented in a medical record, the reward signal may be weighted differently depending upon how pricey the diagnosis was and/or how economically influential the action was. In some examples, codes extracted from the document may yield higher payments and/or returns for some stakeholders, and this information may be processed with a greater weight. In this regard, the critic may steer the actor away from making extremely costly mistakes and may steer the actor toward taking actions that provide a positive monetary reward or savings.

In this regard, according to some embodiments, the monetary reward may be considered a measure of the quality of the classifier at making an appropriate prediction relative to the confirmed classification, and therefore, the relevancy of the vector representation that is a result of the actions taken by the actor.

For example, consider a medical document that includes a diagnosis and/or extensive information regarding a particular immune deficiency disease. A diagnosis relating to an immune deficiency may be explicitly listed or named in a medical record, or could be evident based on lab results appearing in the medical record. In a different area of the medical record, such as a page representing another patient visit or test result, the medical record could indicate an earlier diagnosis of human immunodeficiency virus (HIV). Such an indication may be made (such as a diagnosis code) in a record associated with an earlier appointment. If a present diagnosis only reflects the particular immune deficiency disease, example embodiments may recognize an additional or corrected primary and/or secondary diagnosis of acquired immunodeficiency syndrome (AIDS). The financial benefit to the payor and/or patient may vary based on the more accurate or more complete diagnosis such that example embodiments learn to include an AIDS diagnosis when certain conditions, such as the example conditions set forth above, are indicated in the document. In this regard, example embodiments aim to improve the monetary benefit and/or assess diagnosis codes that may be missing and that if included, would improve a monetary benefit. In this regard, some diagnoses codes may be more valuable than others, and example embodiments may particularly aim to accurately capture those more valuable diagnosis codes where appropriate.

As shown in operation 330, apparatus 200, may include means, such as evaluation circuitry 110, processor 212, memory 214 and/or the like, for updating (e.g., training) the critic to minimize the error signal. The critic may therefore be considered a model trained on an input of a portion of the document being processed and/or parsed, a current summary of the document (e.g., a current vector representation), an updated vector representation created by the actor, and the most recent action taken by the actor. The critic is trained to minimize the error between the expected future reward and the reward at the next time step plus the discounted expected future reward at the next time step.

As shown in operation 332, apparatus 200, may include means, such as evaluation circuitry 110, processor 212, memory 214, communication interface 218, and/or the like, for providing the reward signal to the actor (e.g., vector modeling circuitry 100).

In operation 340, the reward signal from the critic (e.g., evaluation circuitry 110) is used by the actor (e.g., vector modeling circuitry 100) to adjust the parameters such that subsequent actions generated from the policy produce a more relevant and wholly representative vector representation of the document. The critic neural network is therefore trained to determine how effective or ineffective the last action was, and in what direction on an error signal curve, and provide feedback to the actor that can be used in a backpropagation algorithm to update parameters input to the matrix multiplication. As such, the actor is trained to generate actions that will produce a more relevant vector representation as calculated by the critic.

The training time steps illustrated in FIG. 2 may be repeated numerous times on a single training document and its known or confirmed classification. A time step may include a single observation of the current state of the vector representation and the chosen location in the document to read. The observations provide a current state of the vector representation and the sub portion of the document processed in the given episode. An episode may include a complete traversal of the entire document. The iterations of performing time steps and may be completed, and the vector representation finalized, when the error signal converges.

The training process may be performed on numerous documents and respective confirmed classifications, and by using various reinforcement algorithms, including but not limited to Soft Actor-Critic (SAC), deep deterministic policy gradient (DDPG), twin-delayed DDPG (TD3), and/or Advantage Actor Critic (A2C).

Thousands of training samples may be used to train the actor and critic. The model may therefore identify patterns that can be utilized to improve the actions that the actor takes (e.g., select portions of relevant text from the document, and the algorithm with which the test is parsed), and to improve the evaluation of the generated action by the critic. Once trained, the actor-critic model can be used to process other documents (e.g., medical records) without a confirmed classification, and classify the documents by deploying the trained model on the documents. Expanding the training set to include more training documents and confirmed classifications may lead to a better trained actor and critic which may more efficiently classify future medical records that have unknown diagnoses, in comparison to using fewer training documents.

FIG. 3 illustrates a process for utilizing the trained actor and critic networks to classify a document, such as a medical record. FIG. 3 is similar to FIG. 2, except that the process illustrated in FIG. 3 processes documents (e.g., medical records) that do not yet necessarily have a confirmed classification (e.g., diagnosis). The trained actor network (e.g., vector modeling circuitry 100) may perform iterations similar to those performed in the training iterations to generate and aggregate a vector representation based on feedback from the trained critic network (e.g., evaluation circuitry 110) and converge on a value function, such that the document can be classified and the reward signal can be provided to the actor.

In operation 400, apparatus 200, may include means, such as vector modeling circuitry 100, evaluation circuitry 110, processor 212, memory 214, communication interface 118, and/or the like, for receiving an indication of the document comprising at least natural language text. In operation 404, apparatus 200, may include means, such as vector modeling circuitry 100 processor 212, memory 214, and/or the like, for initializing or reconfiguring parameters utilized in generating an action to be performed on the portion of the document. In this regard, on a first episode of processing the document, the parameters may be randomly initialized by the actor (e.g., vector modeling circuitry 100). In subsequent episodes, the parameters are reconfigured based on the fine tuning of the parameters according to feedback from the critic.

In operation 408, apparatus 200, may include means, such as vector modeling circuitry 100, processor 212, memory 214, and/or the like, for identifying a portion of the document on which an action is to be performed. In operation 412, apparatus 200, may include means, such as vector modeling circuitry 100 processor 212, memory 214, and/or the like, for generating the action to be performed. The action is generated based on the policy function at the particular instance in time, which is adjusted by its parameters as described above as performed during training.

In operation 414, apparatus 200, may include means, such as vector modeling circuitry 100 processor 212, memory 214, and/or the like, for performing the generated action on the identified portion of the document to initialize or reconfigure the vector representation in memory. The output of action dictates, in a first episode, what information is gathered from the portion of the document, and how it is represented in the vector representation. The output of the action in subsequent actions indicates how the information gathered from the portion of the document is aggregated into the existing vector representation, to reconfigure the vector representation.

In operation 418, apparatus 200, may include means, such as evaluation circuitry 110, processor 212, memory 214, and/or the like, for performing semantic classification of the structured document based on the vector representation. The semantic classification may include executing or directing a separate classifier or classification process to perform the classification or attempt to perform the classification. In operation 422, apparatus 200, may include means, such as evaluation circuitry 110, processor 212, memory 214, and/or the like, for evaluating the relevancy of the vector representation by evaluating the classification or attempted classification. This may include operation 426, and specifically, generating a reward signal and/or error signal. Apparatus 200, may include means, such as evaluation circuitry 110, processor 212, memory 214, and/or the like, for calculating an error signal and/or reward signal. A reward function may include calculating the task related value of that classification as computed by running a classifier over the vector representation of the document. The process for calculating the error signal and reward are trained during the training phase, and the critic is therefore trained to provide its best estimate of the reward to provide feedback on the last action taken by the actor. As the actor improves the actions it generates for performance on the document, portion by portion, the error signal is minimized through gradient descent, and the reward signal is improved. In operation 432, apparatus 200, may include means, such as evaluation circuitry 110, processor 212, memory 214, communication interface 218 and/or the like, for providing the reward signal to the actor.

In operation 440, apparatus 200, may include means, such as vector modeling circuitry 100 processor 212, memory 214, communication interface 218 and/or the like, for inputting the reward signal to adjust the parameters. In this regard, the parameters are adjusted such that subsequent actions generated by the actor aim to produce a more relevant and wholly representative vector representation of relevant information from the document with each episode.

According to example embodiments, the iterations or episodes conclude when the error signal converges, and the reward signal is therefore determined to be improved or maximized. The end result may include a vector representation that is determined as the best representation of the pertinent information from the document, and can be processed by the classifier to determine a likely primary and/or secondary diagnoses. The primary and/or secondary diagnoses can then be used as verification against diagnoses provided by a healthcare provider (if any). Discrepancies may be flagged for manual review by medical coders such that the documents and diagnosis pairings determined to be the highest risk for producing errors and therefore high expenditures on human cost for correction, may be reviewed earlier on and corrected if necessary, while still not requiring the manual review of each and every document.

In some examples, a primary or secondary diagnoses may not be provided upfront, and example embodiments may initially establish or estimate primary and/or secondary diagnoses according to the processes described herein utilizing the trained model. In such scenarios, if example embodiments do not yield a converging neural network, or if there is some other indicator of a low-confidence classification, the document may also be flagged for manual review. In this regard, example embodiments may streamline the classification of documents found to include data reflecting straight forward diagnoses, while flagging others for manual review, therefore producing improved accuracy while minimizing or reducing the human cost for review.

Embodiments of the present disclosure provide many technical advantages over alternative methods for performing natural language processing and deep learning on a large or complex document. Processing only portions of the document in a given episode, and aggregating the information gradually in a vector representation, may require less memory and fewer processing resources in comparison to attempting to process the entire document in a single procedure. Thus, example embodiments require a computing device with less memory and fewer processing resources than such alternative implementations.

Additionally, example embodiments of the present disclosure utilize less memory and processing time otherwise expended processing portions of documents that are not useful in accomplishing the task (e.g., determining a diagnosis). For example, if the critic determines that processing a portion of the document does not add meaningful information to the vector representation, it may provide feedback to not process the particular portion again, and move on to another portion of the document. If the critic determines that processing a portion of the document does add meaningful information to the vector representation, it may provide feedback to reprocess the same portion of the document again such that the most useful or meaningful information is accurately represented in the vector representation.

In alternative implementations, such as those utilizing a convolutional layer with an input size of embed_len*seq_len and an output of feat_len, the convolutional layer has an input tensor of size 32*300*400*500=1.92e9 bits=0.24 Gb and a convolutional layer size of 32*128*3*400*500=0.31 Gb required for a convolution with a window size of 3. This means that the information aggregated for each word only has a window size of 3. Normally a much larger aggregation is necessary, meaning that the model would be made up of many stacked convolutional layers, which one skilled in the art can estimate would increase the memory requirements 10-fold. Moreover, there are additional memory requirements associated with the backward pass used in training, which would at least triple those requirements, as well that such models are best trained with mini-batches greater than 1. The calculations here would estimate that a single sample would require at least 9 Gb of memory per sample which would limit the batch size to 1 per graphic processing unit (GPU), assuming that most GPU units available have 12 GB of memory.

RNNs may require similar memory requirement, with the additional restriction that the lack of sufficient parallelism would require a compute time scaling linearly with the length of the sequence and an inability to saturate the GPU for most of this time, possibly leading to it being at least an order of magnitude slower than a convolutional model.

For a transformer, processing a sequence of this length is not feasible. Attention memory would be computed as 400*500*400*500*128=640 Gb for a single transformation, and running an attention model over a sequence of that length may also have no semantic meaning. In contrast, example embodiments can efficiently capture and represent the information in an unstructured document and represent it in meaningful format so as enable processing of the full document without information loss.

It will be appreciated that the figures are each provided as examples and should not be construed to narrow the scope or spirit of the disclosure in any way. In this regard, the scope of the disclosure encompasses many potential embodiments in addition to those illustrated and described herein. Numerous other configurations may also be used to implement embodiments of the present invention.

FIGS. 2 and 3 illustrate operations of a method, apparatus, and computer program product according to some example embodiments. It will be understood that each operation of the flowchart or diagrams, and combinations of operations in the flowchart or diagrams, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may comprise one or more memory devices of a computing device (for example, memory 214) storing instructions executable by a processor in the computing device (for example, by processor 212). In some example embodiments, the computer program instructions of the computer program product(s) which embody the procedures described above may be stored by memory devices of a plurality of computing devices. As will be appreciated, any such computer program product may be loaded onto a computer or other programmable apparatus (for example, apparatus 200) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product may comprise an article of manufacture which implements the function specified in the flowchart block(s). The computer program instructions of one or more computer program products may also be loaded onto a computer or other programmable apparatus (for example, apparatus 200 and/or other apparatus) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus for utilizing trained vector modeling circuitry and trained evaluation circuitry to classify a document by iteratively aggregating data from the document into a vector representation, the apparatus comprising at least one processor and at least one memory including computer program code, the at least one memory and the computer program code configured to, with the processor, cause the apparatus to perform operations comprising:
   receiving an indication of the document comprising at least natural language text;
   with the trained vector modeling circuitry, reading a current state of the vector representation and a subsequent portion of the document to be processed;
   with the trained vector modeling circuitry, updating the vector representation based on the current state of the vector representation and the subsequent portion of the document to produce an updated state of the vector representation;
   with the trained evaluation circuitry, calculating a reward signal based on the current state of the vector representation and the updated state of the vector representation;
   iteratively repeating the reading of the current state of the vector representation and the subsequent portion of the document, and the updating of the vector representation based on the reward signal, wherein the updated state of the vector representation is used to perform a semantic classification process to determine a classification of the document; and
   terminating iteratively repeating responsive to convergence of an error signal based on an error between an expected future reward and the reward signal at a next time step plus the discounted expected future reward at the next time step.

2. The apparatus according to claim 1, wherein calculating the reward signal comprises:
   evaluating a relevancy of the updated state of the vector representation relative to the current state of the vector representation to determine an impact on performance of the semantic classification process of updating the vector representation, wherein the reward signal comprises a discounted expected future reward.

3. The apparatus of claim 2, wherein the trained vector modeling circuitry and the trained evaluation circuitry are trained by the at least one memory and the computer program code configured to, with the processor, cause the apparatus to perform operations further comprising:
   receiving an indication of a plurality of training documents and corresponding confirmed classifications; and
   training the vector modeling circuitry and the evaluation circuitry by performing iterations of vector modeling on the plurality of training documents and evaluation of the determined classifications compared to the confirmed classifications.

4. The apparatus of claim 2, wherein at least a portion of the computer program code utilizes an actor-critic algorithm, wherein the trained vector modeling circuitry represents an actor, and the trained evaluation circuitry represents a critic trained to minimize the error between the expected future reward and the reward signal at the next time step plus the discounted expected future reward at the next time step.

5. The apparatus of claim 2, wherein evaluating a relevancy of the updated state of the vector representation relative to the current state of the vector representation comprises determining and comparing a predicted accuracy in classifying the document according to the updated and current state of the vector representation, respectively.

6. The apparatus of claim 5, wherein the reward signal is further based on a value function comprising an estimated monetary reward.

7. The apparatus of claim 2, wherein the semantic classification process comprises:
   determining there is not enough information in the vector representation to determine a classification of the document; or
   determining a classification of the document according to the vector representation,
   wherein if it is determined there is not enough information in the vector representation to determine a classification of the document, the semantic classification process further comprises:
   identifying a subsequent portion of the document to be processed.

8. The apparatus of claim 7, wherein the document is a medical record, and wherein determining a classification of the document comprises determining (a) a primary diagnosis or (b) one or more secondary diagnoses.

9. The apparatus of claim 8, wherein the operations further comprise:
   evaluating a quality of the semantic classification process performed on the vector representation by assessing a monetary value of at least one of the primary diagnosis or the one or more secondary diagnosis codes.

10. A method for utilizing trained vector modeling circuitry and trained evaluation circuitry to classify a document by iteratively aggregating data from the document into a vector representation, the method comprising:
   receiving an indication of the document comprising at least natural language text;
   with the trained vector modeling circuitry, initializing the vector representation in memory by incorporating information from an identified portion of the document into the vector representation;
   with the trained evaluation circuitry, evaluating a relevancy of the vector representation of the document by evaluating a quality of a semantic classification process performed on the vector representation to determine a classification of the document; and
   iteratively repeating:
      with the trained vector modeling circuitry, reconfiguring in memory the vector representation based on a subsequent portion of the document; and
      with the trained evaluation circuitry, evaluating the relevancy of the reconfigured vector representation by evaluating the quality of the semantic classification process performed on the reconfigured vector representation;
   wherein evaluating the quality of the semantic classification process comprises:
   calculating an error signal associated with the vector representation;
   applying the error signal to a gradient descent algorithm; and
   determining a last iteration and a final vector representation based on a convergence of the gradient descent algorithm.

11. The method of claim 10, wherein the trained vector modeling circuitry and the trained evaluation circuitry are trained by operations comprising:
receiving an indication of a plurality of training documents and corresponding confirmed classifications; and
training the vector modeling circuitry and the evaluation circuitry by performing iterations of vector modeling on the plurality of training documents and evaluation of the determined classifications compared to the confirmed classifications.

12. The method of claim 10, wherein the method is implemented by computer program code utilizing an actor-critic algorithm, wherein the trained vector modeling circuitry represents an actor, and the trained evaluation circuitry represents a critic.

13. The method of claim 10, performing, using the trained vector modeling circuitry, operations comprising:
initializing parameters utilized in generating an action to perform on at least the portion of the document;
generating the action based on the initialized parameters; and
adjusting the parameters to generate a subsequent action according to the evaluation provided by the trained evaluation circuitry.

14. The method of claim 10, wherein evaluating the quality of the semantic classification process comprises determining a reward signal, wherein the reward signal is determined based on a predicted accuracy in classifying the document according to the vector representation.

15. The method of claim 14, wherein determining the reward signal is further based on a value function comprising an estimated monetary reward associated with the classification made as a result of the aggregation.

16. The method of claim 10, wherein the semantic classification process comprises:
determining there is not enough information in the vector representation for classifying the document; or
classifying the document according to the vector representation,
wherein if it is determined there is not enough information in the vector representation for classifying the document, the semantic classification process further comprises:
identifying a subsequent portion of the document to be processed.

17. The method of claim 16, wherein the document is a medical record, and wherein classifying the document comprises determining (a) a primary diagnosis or (b) one or more secondary diagnoses.

18. The method of claim 17, wherein evaluating a quality of a semantic classification process performed on the vector representation comprises assessing the monetary value of at least one of the diagnosis or the one or more secondary diagnoses codes.

19. A computer program product for utilizing trained vector modeling circuitry and trained evaluation circuitry to classify a document by iteratively aggregating data from the document into a vector representation, the computer program product comprising at least one non-transitory computer-readable storage medium having computer-executable program code instructions stored therein, the computer-executable program code instructions when executed by a processor causing the processor to perform operations comprising:
receiving an indication of the document comprising at least natural language text;
with the trained vector modeling circuitry, initializing the vector representation in memory by incorporating information from an identified portion of the document into the vector representation;
with the trained evaluation circuitry, evaluating a relevancy of the vector representation of the document by evaluating a quality of a semantic classification process performed on the vector representation; and
iteratively repeating:
with the trained vector modeling circuitry, reconfiguring in memory the vector representation based on a subsequent portion of the document; and
with the trained evaluation circuitry, evaluating the relevancy of the reconfigured vector representation by evaluating the quality of the semantic classification process performed on the reconfigured vector representation;
wherein evaluating the quality of the semantic classification process comprises:
calculating an error signal associated with the vector representation;
applying the error signal to a gradient descent algorithm; and
determining a last iteration and a final vector representation based on a convergence of the gradient descent algorithm.

\* \* \* \* \*